(12) United States Patent
Akutsu et al.

(10) Patent No.: US 9,035,505 B2
(45) Date of Patent: May 19, 2015

(54) MOTOR FOR AN ELECTRIC POWER STEERING APPARATUS

(75) Inventors: Satoru Akutsu, Chiyoda-ku (JP); Kazuhisa Takashima, Chiyoda-ku (JP); Yoshihito Asao, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 183 days.

(21) Appl. No.: 12/899,257

(22) Filed: Oct. 6, 2010

(65) Prior Publication Data
US 2011/0278995 A1    Nov. 17, 2011

(30) Foreign Application Priority Data

May 12, 2010 (JP) ................................. 2010-110351

(51) Int. Cl.
| | |
|---|---|
| *H02K 11/00* | (2006.01) |
| *B62D 5/04* | (2006.01) |
| *H02K 7/116* | (2006.01) |
| *H02K 21/16* | (2006.01) |

(52) U.S. Cl.
CPC ............ *B62D 5/0403* (2013.01); *B62D 5/0406* (2013.01); *H02K 7/1166* (2013.01); *H02K 11/0031* (2013.01); *H02K 11/0073* (2013.01); *H02K 21/16* (2013.01); *H02K 2213/03* (2013.01)

(58) Field of Classification Search
CPC ............... B62D 5/0403; H02K 7/1166; H02K 11/0031; H02K 11/0073
USPC .................................................. 310/68 D, 51
See application file for complete search history.

(56) References Cited

U.S. PATENT DOCUMENTS

| | | | | |
|---|---|---|---|---|
| 4,905,423 | A * | 3/1990 | van Laere .................... | 451/461 |
| 6,335,582 | B1 * | 1/2002 | Abukawa et al. ............. | 310/214 |
| 6,517,328 | B2 * | 2/2003 | Makino et al. ............. | 417/410.1 |
| 6,577,030 | B2 | 6/2003 | Tominaga et al. | |
| 6,603,225 | B2 * | 8/2003 | Heine et al. ................. | 310/67 R |
| 6,707,185 | B2 | 3/2004 | Akutsu et al. | |
| 7,021,418 | B2 * | 4/2006 | Tominaga et al. ............ | 180/444 |

(Continued)

FOREIGN PATENT DOCUMENTS

| | | |
|---|---|---|
| DE | 201 07 523 U1 | 8/2001 |
| DE | 100 49 883 A1 | 4/2002 |

(Continued)

OTHER PUBLICATIONS

German Office Action in corresponding German Patent Application No. 10 2010 062 985.9 dated Nov. 9, 2011.

(Continued)

*Primary Examiner* — Alex W Mok
(74) *Attorney, Agent, or Firm* — Sughrue Mion, PLLC

(57) ABSTRACT

Provided is a motor for an electric power steering apparatus, in which vibrations and noises are suppressed. The motor for an electric power steering apparatus includes: a motor section (1) for outputting an assist torque to a handle of a vehicle; and a controller (2) for controlling driving of the motor section (1). The motor section (1) includes: a rotor (14, 14A) having P poles; and a stator (15, 15A) provided so as to surround the rotor (14, 14A), the stator including: a stator core (23) provided with n slots formed thereon and housed in a frame (4); and three-phase stator windings (25) wound around the slots (22). The controller (2) is provided between a boss (18) and the motor section (1) so as to surround the output shaft (12).

14 Claims, 8 Drawing Sheets

(56) References Cited

U.S. PATENT DOCUMENTS

| | | | |
|---|---|---|---|
| 7,183,681 B2* | 2/2007 | Segawa et al. | 310/68 B |
| 2002/0047344 A1* | 4/2002 | Herndon et al. | 310/67 R |
| 2002/0047425 A1* | 4/2002 | Coupart et al. | 310/156.01 |
| 2002/0175574 A1* | 11/2002 | Okazaki et al. | 310/68 B |
| 2003/0201688 A1* | 10/2003 | Yamamura et al. | 310/216 |
| 2003/0234588 A1* | 12/2003 | Machida | 310/71 |
| 2004/0145260 A1* | 7/2004 | Tamaoka et al. | 310/90 |
| 2004/0201296 A1* | 10/2004 | Hama et al. | 310/71 |
| 2007/0063596 A1* | 3/2007 | Akutsu et al. | 310/68 B |
| 2007/0246289 A1* | 10/2007 | Tominaga | 180/444 |
| 2007/0273241 A1* | 11/2007 | Niguchi et al. | 310/259 |
| 2008/0012445 A1* | 1/2008 | Abe et al. | 310/217 |
| 2009/0195104 A1* | 8/2009 | Akutsu et al. | 310/156.38 |
| 2009/0251030 A1* | 10/2009 | Fujimoto et al. | 310/68 B |

FOREIGN PATENT DOCUMENTS

| | | | | |
|---|---|---|---|---|
| EP | 872943 A1 * | 10/1998 | | H02K 1/14 |
| JP | 64-090869 A | 4/1989 | | |
| JP | 3614380 B2 | 11/2002 | | |
| JP | 3593102 B2 | 7/2003 | | |
| JP | 2006-027355 A | 2/2006 | | |
| JP | 2006-320168 A | 11/2006 | | |
| JP | 2009-248796 A | 10/2009 | | |
| JP | 2009-254103 A | 10/2009 | | |
| JP | 2010-012819 A | 1/2010 | | |

OTHER PUBLICATIONS

Preliminary Notice of Reasons for Rejection; dated May 8, 2012.
German Office Action dated Jul. 15, 2014 issued in German Patent Application No. 10-2010026985.9.

* cited by examiner

FIG. 8

| NUMBER OF POLES | 2 | 4 | 8 | 10 | 10 | 14 |
|---|---|---|---|---|---|---|
| NUMBER OF SLOTS | 3 | 3 | 9 | 9 | 12 | 12 |
| SHORT-PITCH WINDING FACTOR [FUNDAMENTAL WAVE] | 0.866 | 0.866 | 0.9848 | 0.9848 | 0.9659 | 0.9659 |
| SHORT-PITCH WINDING FACTOR [FIFTH-ORDER HARMONIC WAVE] | -0.866 | -0.866 | 0.6428 | 0.6428 | 0.2588 | 0.2588 |
| SHORT-PITCH WINDING FACTOR [SEVENTH-ORDER HARMONIC WAVE] | 0.866 | 0.866 | -0.3420 | -0.3420 | 0.2588 | 0.2588 |
| DISTRIBUTED WINDING FACTOR [FUNDAMENTAL WAVE] | 1 | 1 | 0.9598 | 0.9598 | 0.9659 | 0.9659 |
| DISTRIBUTED WINDING FACTOR [FIFTH-ORDER HARMONIC WAVE] | 1 | 1 | 0.2176 | 0.2176 | 0.2588 | 0.2588 |
| DISTRIBUTED WINDING FACTOR [SEVENTH-ORDER HARMONIC WAVE] | 1 | 1 | -0.1774 | -0.1774 | -0.2588 | -0.2588 |
| WINDING FACTOR [FUNDAMENTAL WAVE] | 0.866 | 0.866 | 0.9452 | 0.9452 | 0.933 | 0.933 |
| WINDING FACTOR [FIFTH-ORDER HARMONIC WAVE] | -0.866 | -0.866 | 0.1398 | 0.1398 | 0.067 | 0.067 |
| WINDING FACTOR [SEVENTH-ORDER HARMONIC WAVE] | 0.866 | 0.866 | 0.0607 | 0.0607 | -0.067 | -0.067 |

SUPPLEMENT) SAME VALUE OF WINDING FACTOR IS OBTAINED WITH SAME RATIO OF NUMBER OF POLES AND NUMBER OF SLOTS

US 9,035,505 B2

MOTOR FOR AN ELECTRIC POWER STEERING APPARATUS

BACKGROUND OF THE INVENTION

The present invention relates to a motor for an electric power steering apparatus, which is mounted to a vehicle to assist a steering force applied by a driver.

As a conventional motor for controller integrated electric power steering apparatus, a motor including a controller provided on a side surface portion of a motor section is known (for example, see JP 3593102 B (pages 5 to 8, and FIGS. 1 and 2).

In the motor for electric power steering apparatus, described in JP 3593102 B, however, the controller, which is a heavy load, is mounted onto the side surface portion of the motor section. Therefore, a center of gravity of the motor is located radially eccentrically from an output shaft. Accordingly, there is a problem in that vibrations and noises are likely to be generated.

SUMMARY OF THE INVENTION

The present invention has been made to solve the problem described above, and therefore has an object to provide a motor for an electric power steering apparatus, in which vibrations and noises are suppressed.

The present invention provides a motor for an electric power steering apparatus including: a motor section including an output shaft connected to a speed reducer mechanism through an intermediation of a coupling, the motor section being for outputting an assist torque to a handle of a vehicle; and a controller for controlling driving of the motor section, in which the motor section includes: a rotor having P poles; and a stator provided so as to surround the rotor, the stator including: a stator core provided with n slots equiangularly formed thereon and housed in a cylindrical frame; and three-phase stator windings obtained by winding conductors around the slots, and the controller is provided between the coupling and the motor section so as to surround the output shaft.

According to the motor for an electric power steering apparatus according to the present invention, the controller is provided between the coupling and the motor section so as to surround the output shaft. Therefore, the amount of eccentricity of a center of gravity of the motor from the output shaft can be reduced. Hence, even if an electromagnetic force for deforming the stator core into an ellipsoidal shape is exerted on the stator core, vibrations and noises can be prevented from being amplified.

BRIEF DESCRIPTION OF THE DRAWINGS

In the accompanying drawings:

FIG. 8 is a view illustrating the relation between the combination number of poles (number of permanent magnets) and number of slots (number of teeth), and winding factor.

DETAILED DESCRIPTION OF THE PREFERRED EMBODIMENTS

Figure 1:
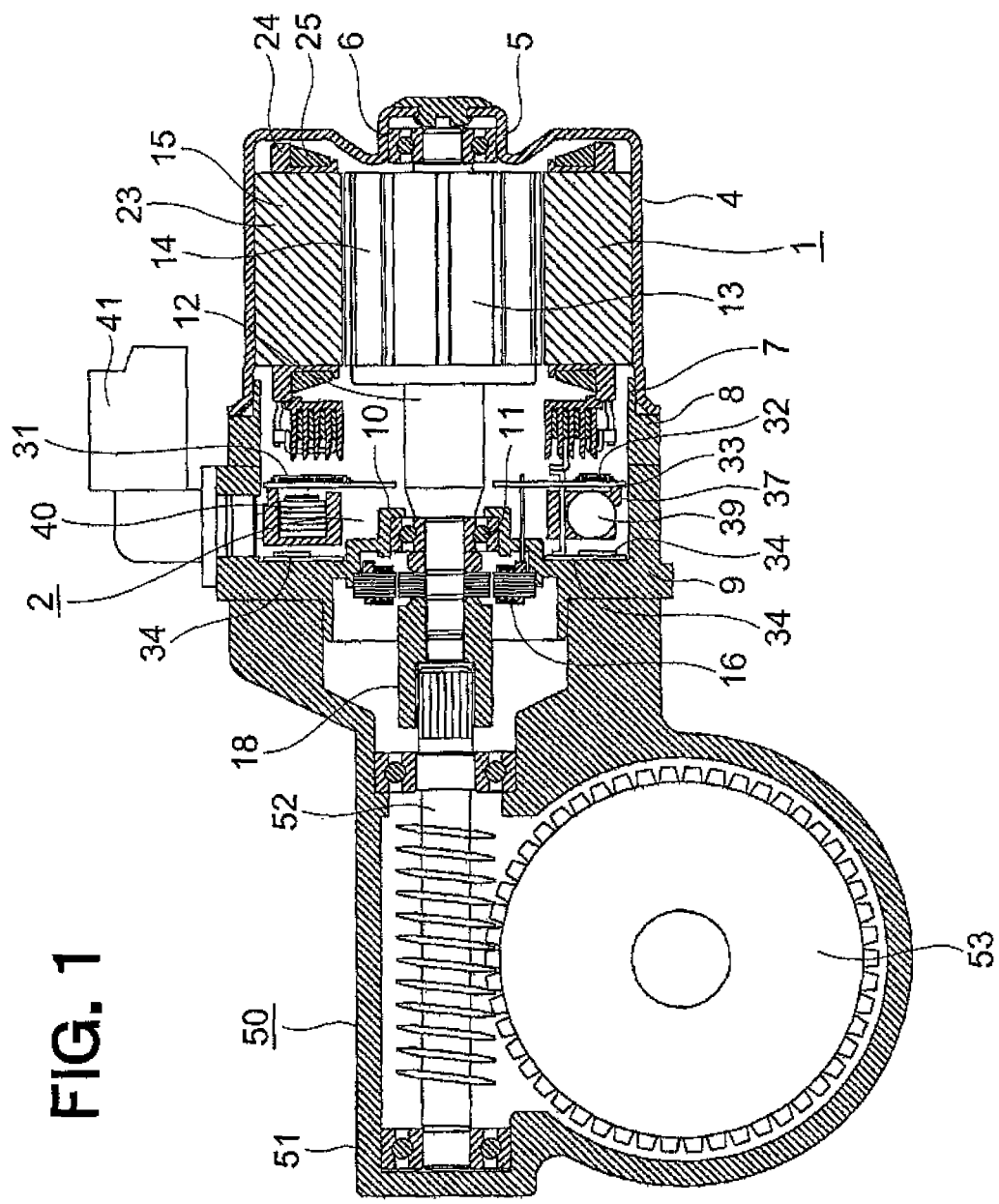
FIG. 1 is a side sectional view illustrating a motor for an electric power steering apparatus according to a first embodiment of the present invention, which includes a speed reducer mechanism.

Hereinafter, embodiments of the present invention are described based on the accompanying drawings. In the drawings, the same or equivalent members and portions are denoted by the same reference numerals.

First Embodiment

Figure 2:
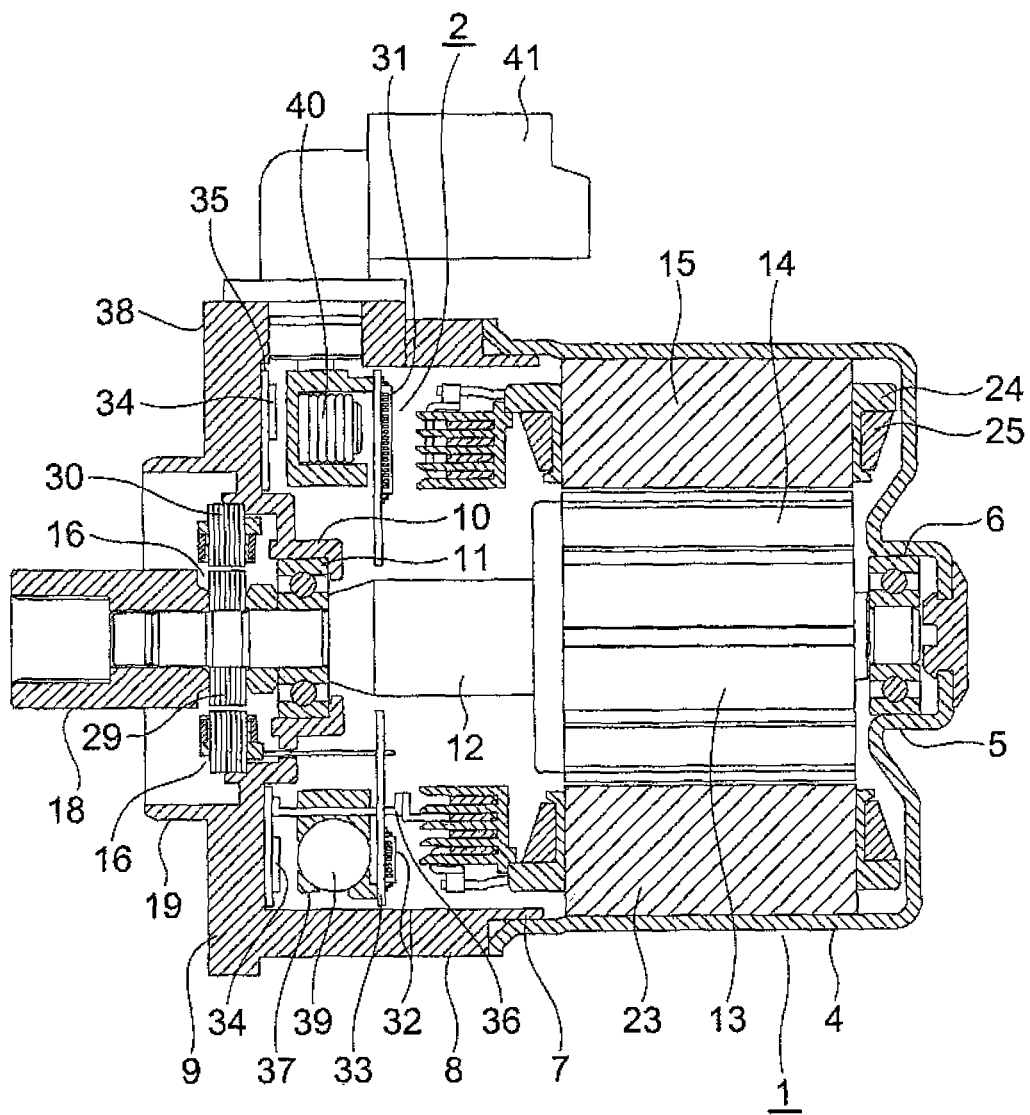
FIG. 2 is a side sectional view illustrating the motor for an electric power steering apparatus illustrated in FIG. 1.
Figure 3:
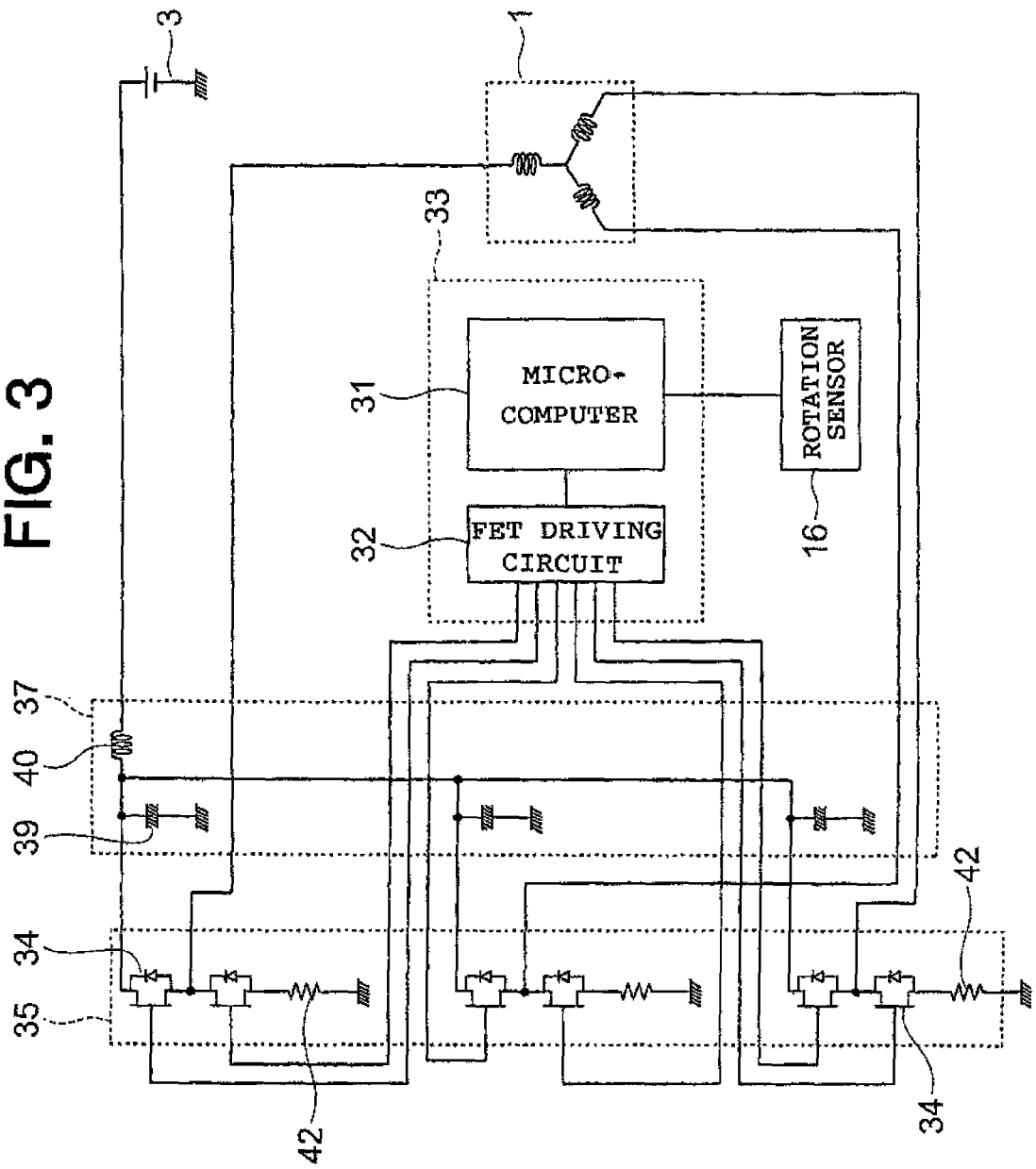
FIG. 3 is an electric circuit diagram illustrating the motor for an electric power steering apparatus illustrated in FIG. 1.
Figure 4:
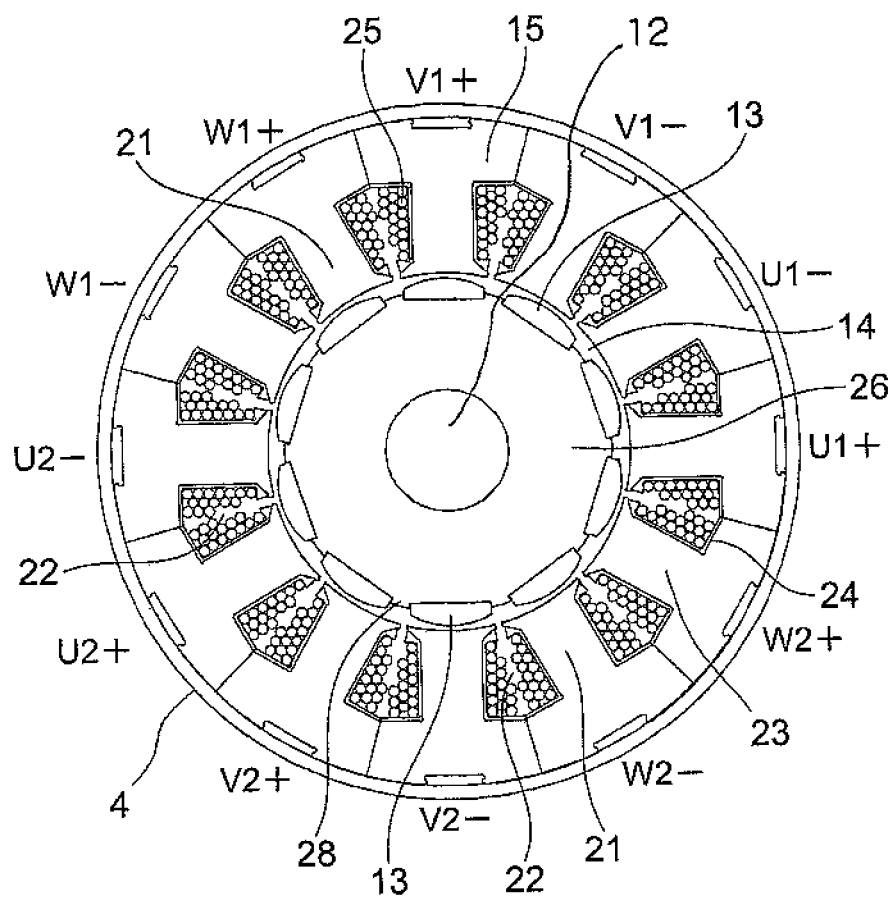
FIG. 4 is a front sectional view illustrating a motor section illustrated in FIG. 1.

FIG. 1 is a side sectional view illustrating a motor for an electric power steering apparatus (hereinafter, abbreviated as "motor") according to a first embodiment of the present invention, which includes a speed reducer mechanism 50. FIG. 2 is a side sectional view illustrating the motor illustrated in FIG. 1. FIG. 3 is an electric circuit diagram illustrating the motor illustrated in FIG. 1. FIG. 4 is a front sectional view illustrating a motor section 1 illustrated in FIG. 1.

The motor includes: the motor section 1 for outputting an assist torque to a handle of a vehicle (not shown); and a controller 2 for controlling the supply of a current from a battery 3 to the motor section 1 so as to control the driving of the motor section 1.

The motor section 1, which is a three-phase brushless motor, includes: a cylindrical frame 4 having a closed end; a rear bearing 6; a motor section-side case 8 having a cylindrical shape; and a speed reducer mechanism-side case 9 having a cylindrical shape. The rear bearing 6 is pressed into a rear bearing box portion 5 formed on a bottom of the frame 4. The motor section-side case 8 is connected to a flange portion 7 formed on an opening-side end portion of the frame 4 by interference fit. The speed reducer mechanism-side case 9 is connected to an end surface of the motor section-side case 8. Each of the motor section-side case 8 and the speed reducer mechanism-side case 9 is a die-cast product made of an aluminum alloy. The motor section-side case 8 and the speed reducer mechanism-side case 9 constitute a motor case.

The motor section 1 further includes: a front bearing 11; an output shaft 12; a rotor 14; a stator 15; a rotation sensor 16; and a boss 18. The front bearing 11 is pressed into a front bearing box 10 provided to the speed reducer mechanism-side case 9 having a flange portion 19. The output shaft 12 has one end rotatably supported by the front bearing 11 and the other end rotatably supported by the rear bearing 6. The rotor 14 is fixed to the output shaft 12. The stator 15 is provided around the rotor 14 and is pressed into the frame 4. The rotation sensor 16 is provided on the output side of the output shaft 12 so as to detect a rotational position of the rotor 14. The boss 18 is a coupling which is pressed into a distal end portion of the output shaft 12 and is for coupling the output shaft 12 to the speed reducer mechanism 50.

The rotor 14 includes: a rotor core 26; and ten permanent magnets 13 provided equiangularly on a surface of the rotor core 26. Each of the permanent magnets 13 has a half barrel-like cross section. The permanent magnets 13 are alternately magnetized to N-pole and S-pole.

The rotor core 26 has projecting portions 28 between the adjacent permanent magnets 13. Each of the projecting portions 28 projects radially from the surface of the rotor core 26.

The stator 15 includes: a stator core 23; and stator windings 25. The stator core 23 includes twelve slots 22 formed by twelve teeth 21, each projecting toward the rotor 14. The stator windings 25 are formed by winding conductors around the teeth 21 through insulators 24.

The stator core 23 formed by laminating thin steel plates has an outer diameter of 70 mm to 90 mm and an axial length of 20 mm to 70 mm. A thickness of the frame 4 formed of a steel plate is 1.6 mm or larger.

The number of the teeth 21 provided to the stator core 23 is twelve, whereas the number of the permanent magnets 13 of the rotor 14 is ten.

Therefore, when the number of poles is P and the number of slots (the number of the teeth 21) is n, a ratio, P:n=10:12, is obtained. Therefore, a relation: P−n=−2 is established.

The number of phases of the stator windings 25 is three. When the three phases are respectively a U-phase, a V-phase, and a W-phase, the arrangement of winding portions are U1+, U1−, V1−, V1+, W1+, W1−, U2−, U2+, V2+, V2−, W2−, and W2+ in a counterclockwise direction of FIG. 4. Here, the signs + and − indicate a direction of winding of the conductor and mean that the conductors are wound in directions opposite to each other.

Furthermore, the winding portions U1+ and U1− are connected in series. The winding portions U2− and 2+ are also connected in series. The two series circuits may be connected in parallel or in series.

The connections are made in the same way for the V-phase and the W-phase. Furthermore, the three-phase may be connected in any one of a Y-configuration and a delta-configuration.

At a position to which one of the winding portions is opposed so as to be 180 degrees in mechanical angle apart (at a position six slots away because twelve slots are provided in this case), the winding portion obtained by concentrated winding of the same phase is provided.

At a position 120 degrees (corresponding to four slots) or 90 degrees (corresponding to three slots) apart from the one winding portion, the winding portion obtained by concentrated winding of the same phase is not provided.

The rotation sensor 16 is a resolver including a resolver rotor 29 and a resolver stator 30. An outer diameter of the resolver rotor 29 has a special curve so that a permeance of a radial clearance between the resolver stator 30 and the resolver rotor 29 changes in a sine wave form in terms of angle.

An exciter coil and two sets of output coils are wound around the resolver stator 30. The rotation sensor 16 detects a change in radial clearance between the resolver rotor 29 and the resolver stator 30 to output two-phase output voltages respectively changing in sine and cosine wave forms.

The controller 2 is provided between the motor section 1 and the speed reducer mechanism-side case 9. The controller 2 includes: a control board 33 made of glass epoxy; a metal-based drive board 35; and a terminal portion 37. A microcomputer 31 and a FET driving circuit 32 are mounted on the control board 33. Power elements 34 such as power MOS-FETs are mounted on the drive board 35. A terminal 36 made of copper is provided between the control board 33 and the drive board 35 so as to electrically connect the control board 33 and the drive board 35 to each other. The terminal portion 37 is integrally formed with the terminal 36 by insert-molding of a resin. A constant distance is ensured between the control board 33 and the drive board 35 by the terminal portion 37.

The control board 33 is provided on the motor section 1 side of the terminal portion 37. The metal-based drive board 35 is held in close contact with an inner circumferential wall surface of the speed reducer mechanism-side case 9 made of an aluminum alloy. With this structure, heat of the power elements 34 is externally released through the drive board 35 and the speed reducer mechanism-side case 9.

Capacitors 39 for absorbing a ripple component of a current flowing through the motor section 1 are mounted to the terminal portion 37. Each of the capacitors 39 is connected to a corresponding one of the power elements 34 mounted on the drive board 35 through an intermediation of a terminal (not shown). A coil 40 for absorbing electromagnetic noise is also mounted to the terminal portion 37. The coil 40 is connected to a power supply connector 41 through an intermediation of a terminal (not shown).

The motor includes the boss 18 which is a coupling for coupling the output shaft 12 to the speed reducer mechanism 50.

The speed reducer mechanism 50 includes: a case 51; a worm 52; and a worm wheel 53. The case 51 has an end surface which is held in surface contact with a mount surface 38 of the speed reducer mechanism-side case 9. A distal end portion of the worm 52 is spline-engaged with the boss 18. The worm wheel 53 is meshed with the worm 52.

A signal of the motor current flowing through the motor section 1, which is output from current detection means (not shown) connected to shunt resistors 42, a steering torque signal output from a torque sensor (not shown), and a rotational position signal of the rotor 14, which is output from the rotation sensor 16, are input to the microcomputer 31 included in the motor described above.

The microcomputer 31 computes a current corresponding to an assist torque based on the input signals described above, and then outputs driving signals to the power elements 34 constituting a bridge circuit through the FET driving circuit 32. Each of the power elements 34 is driven by the drive signal so as to control the current flowing through the motor section 1.

The current controlled by the control device 2 flows through the stator windings 25. With a rotational magnetic field generated in the stator windings 25, the rotor 14 with a controlled torque rotates.

With the rotation of the rotor 14, the output shaft 12 also rotates. The worm 52, which is connected to the output shaft 12 through an intermediation of the boss 18, and the worm wheel 53, which is meshed with the worm 52, simultaneously decelerate while changing rotating directions thereof so that the rotating directions become perpendicular to each other. In this manner, the assist torque is increased.

The assist torque is transmitted to a handle joint (not shown) and a steering gear (not shown). The steering gear changes a direction of rotation and also decelerates the rotation of a column shaft (not shown). At the same time, the steering gear converts the movement of a rack (not shown) into linear movement so that the rack is moved to a desired position. Wheels are moved by the linear movement of the rack to allow a vehicle to change in direction or the like.

According to the motor having the aforementioned configuration, the controller 2 is provided between the boss 18 and the motor section 1 so as to surround the output shaft 12. In addition, the controller 2 is located coaxially with the output shaft 12. Therefore, a center of gravity of the motor can be prevented from being located eccentrically from the output shaft 12.

Moreover, the two sets of the three-phase stator windings 25 are wound around the stator core 23 of the stator 15. In addition, the winding portions of the same phase are arranged in the slots 22 which are opposed to each other so as to be 180 degrees in mechanical angle apart. With the arrangement described above, the electromagnetic force for deforming the stator 15 having a circular shape, which is likely to be deformed, into an ellipsoidal shape is exerted on the stator 15. Although vibration or noise is generated in the stator 15, the center of gravity of the motor is prevented from being located eccentrically from the output shaft 12. Thus, the noise or vibration is prevented from being amplified due to the eccentricity of the center of gravity of the motor in addition to the effects produced by the deformation of the stator core 23 into the ellipsoidal shape.

Moreover, the number P of the poles is ten and the number n of slots is twelve for the motor. As shown in FIG. 8, the motor has a large winding factor for a fundamental wave and small winding factors for harmonic waves.

As a result, the large torque is generated with a small amount of the permanent magnets 13, while the torque ripple can be reduced.

Moreover, as is understood from FIG. 8, the combinations 8:9 and 10:9 as the ratio P:n also have a large winding factor for the fundamental wave. However, the aforementioned combinations have large winding factors even for the harmonic waves. As a result, the torque ripple is increased. In order to reduce the torque ripple, a skew or the like is required, which results in a reduced torque. Therefore, the aforementioned combinations are not preferred.

Furthermore, the same winding factor is obtained with another combination which provides 10:12 as a ratio of the number P of poles and the number of slots, for example, with twenty poles and twenty-four slots. However, the motor with ten poles and twelve slots is superior to the motor with twenty poles and twenty-four slots because an eddy current loss is disadvantageously increased to lower motor characteristics, the number of components is increased to increase cost as a result of the increased number of poles in the case of the aforementioned combination.

The winding factors (short-pitch winding factor×distributed winding factor) are calculated from the number of phases, the number of poles, the number of slots, and the arrangement of the winding portions according to a known calculation formula.

The frame 4, into which the stator core 23 having the outer diameter in the range of 70 mm to 90 mm and the axial length in the range of 20 mm to 70 mm is pressed, is made of the steel plate having the thickness of 1.6 mm or larger. Therefore, even if the electromagnetic force for deforming the stator core 23 into the ellipsoidal shape is generated, the amount of deformation of the stator core 23 into the ellipsoidal shape and the vibration occurring with the deformation can be reduced.

Moreover, the motor section-side case 8 and the frame 4 are firmly connected to each other because the opening end portion of the frame 4 and the flange portion 7 of the motor section-side case 8 are connected to each other by interference fit. Therefore, a rigidity of the stator 15 is increased. Correspondingly, even if the electromagnetic force for deforming the stator core 23 into the ellipsoidal shape is generated, the amount of deformation of the stator core 23 into the ellipsoidal shape and the vibration occurring with the deformation can be reduced.

Although the speed reducer mechanism-side case 9 and the motor section-side case 8 which constitute the motor case are separate bodies in this first embodiment, the motor case may also be an integrated body. In such a case, the opening end portion of the frame 4 and the motor case are connected to each other by interference fit.

Furthermore, the speed reducer mechanism 50 has the worm 52 which is coaxial with the output shaft 12 and is spline-connected to the output shaft 12 through an intermediation of the boss 18. As a result, the noise or vibration, which occurs in the motor while being reduced, can be prevented from being amplified in the speed reducer mechanism 50.

Second Embodiment

Figure 5:
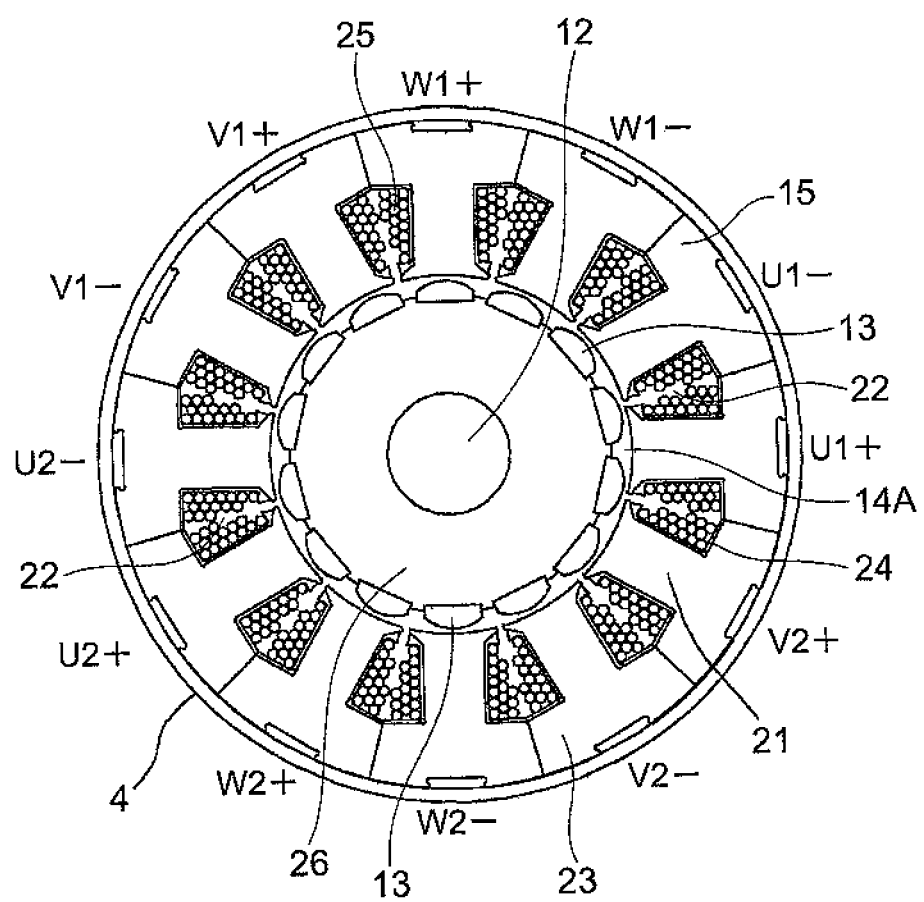
FIG. 5 is a front sectional view illustrating the motor section according to a second embodiment of the present invention.

FIG. 5 is a front sectional view illustrating the motor section 1 according to a second embodiment of the present invention.

In this second embodiment, the number P of poles and the number n of slots satisfy relations: P:n=14:12, and therefore, p−n=2. The winding portions are arranged in the order of: U1+, U1−, W1−, W1+, V1+, V1−, U2−, U2+, W2+, W2−, V2−, and V2+ in the counterclockwise direction of FIG. 5 (the signs + and − means that the directions of windings are opposite to each other).

At the position which is opposed to one winding portion so as to be 180 degrees in mechanical angle (corresponding to six slots) apart, the winding portion of the same phase is provided. At the position 120 degrees (corresponding to four slots) or 90 degrees (corresponding to three slots) apart, the winding portion of the same phase is not provided.

Specifically, the motor according to the second embodiment is the same as that of the first embodiment except that the number of the permanent magnets 13 of a rotor 14A is increased from ten to fourteen.

Here, the reason why the number of poles and the number of slots are selected to be fourteen and twelve as a combination is because the same winding factors as those obtained with the combination of ten poles and twelve slots are obtained as shown in FIG. 8. Specifically, a large winding factor is obtained for the fundamental wave, whereas small winding factors are obtained for the harmonic waves.

The winding factors described above mean that the large torque can be generated with a small amount of magnets while the torque ripple is reduced. As a result, the high-performance motor can be supplied at low cost.

The same winding factors are obtained with another combination which provides 14:12 as a ratio of the number P of poles and the number of slots, for example, with twenty-eight poles and twenty-four slots. However, the motor with fourteen poles and twelve slots is superior to the motor with the aforementioned combination because the eddy current loss is disadvantageously increased to the lower motor characteristics, the number of components is increased to increase cost as a result of the increased number of poles in the case of the aforementioned combination.

Third Embodiment

Figure 6:
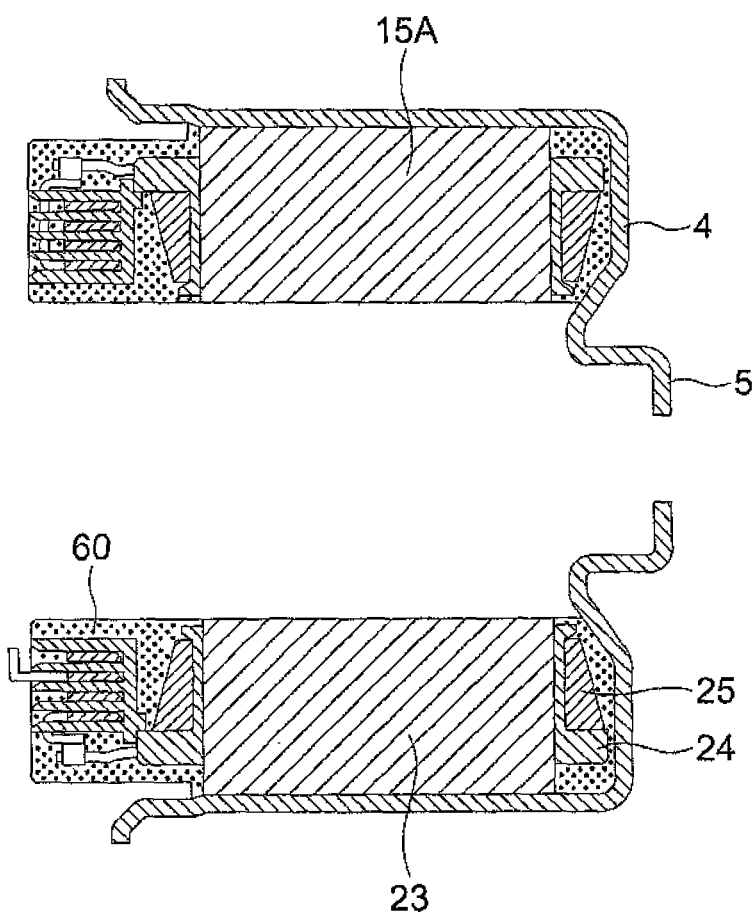
FIG. 6 is a side sectional view illustrating a stator of a motor for an electric power steering apparatus according to a third embodiment of the present invention.
Figure 7:
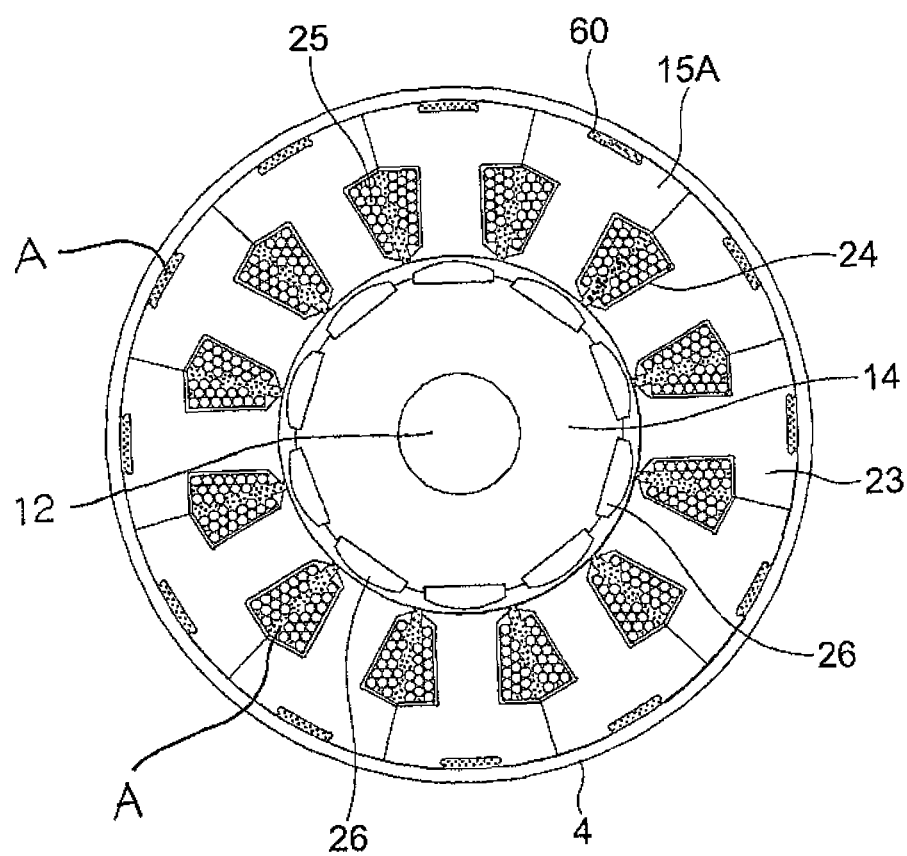
FIG. 7 is a front sectional view illustrating the motor for an electric power steering apparatus illustrated in FIG. 6.

FIG. 6 is a side sectional view illustrating a stator 15A of the motor according to a third embodiment of the present invention, whereas FIG. 7 is a front sectional view illustrating the motor illustrated in FIG. 6.

In this third embodiment, clearances A in the slots 22 and those between the frame 4 and the stator core 23 are filled with a resin 60. The resin 60 is a resin having a relatively high hardness such as unsaturated polyester and epoxy and has the effects of increasing the rigidity of the stator 15A.

The remaining structure is the same as that of the motor according to the first embodiment.

The clearances A lock the stator core 23 for the positioning thereof at the time when the stator windings 25 are wound around the stator core 23. The clearances A also serve to reduce a force for pressing the stator core 23 into the frame 4.

According to the motor described above, even if the electromagnetic force for deforming the stator core 23 into the ellipsoidal shape, the amount of deformation of the stator core 23 into the ellipsoidal shape, and the vibrations and noises occurring with the deformation can be further suppressed as compared with the motor according to the first embodiment because the rigidity of the stator 15A is remarkably improved by the resin 60.

Even if only any one of the clearances A in the slots 22 and the clearances A between the frame 4 and the stator core 23 are filled with the resin 60, the rigidity of the stator 15A can be improved.

In each of the aforementioned embodiments, the motor including the two sets of the three-phase windings wound around the stator core, in which the winding portions of the same phase are provided in the slots which are opposed to each other so as to be 180 degrees in mechanical angle apart, has been described as a motor in which the electromagnetic force for deforming the stator core into the ellipsoidal shape is exerted on the stator core. However, the present invention is also applicable to a motor including the two sets of three-phase windings wound around the stator core, in which the electromagnetic force for deforming the stator core into the ellipsoidal shape is exerted on the stator core, and to a motor including the winding portions of the same phase which are provided in the slots opposed to each other so as to be 180 degrees in mechanical angle apart, in which the electromagnetic force for deforming the stator core into the ellipsoidal shape is exerted on the stator core.

Moreover, the present invention is also applicable to a motor in which the electromagnetic force as described above does not act, that is, a motor, in which the two sets of the three-phase windings are not wound around the stator core and the winding portions of the same phase are not provided in the slots which are opposed to each other so as to be 180 degrees in mechanical angle apart. Even in the case of the motors described above, the controller is provided between the coupling and the motor section so as to surround the output shaft. Therefore, the degree of eccentricity of center of gravity of the motor from the output shaft can be reduced to suppress the vibrations and noises.

What is claimed is:

1. A motor for an electric power steering apparatus, comprising:
    a motor section including an output shaft connected to a speed reducer mechanism through an intermediation of a coupling, the motor section being for outputting an assist torque to a handle of a vehicle; and
    a controller for controlling driving of the motor section, wherein:
    the motor section includes: a rotor having P poles; and a stator provided so as to surround the rotor, the stator including: a stator core provided with n slots equiangularly formed thereon and housed in a cylindrical frame; and three-phase stator windings obtained by winding conductors around the slots; and
    the controller is provided between the coupling and the motor section so as to surround the output shaft,
    wherein a mount surface of a speed reducer mechanism-side case, which surrounds the controller, contacts an end surface of a speed reducer mechanism case, the speed reducer mechanism-side case being provided with a bearing pressured into a bearing box provided in the speed reducer mechanism-side case, the bearing rotatively holding the output shaft,
    wherein clearance between the bottom of the frame and the side of the stator core is filled with a resin,
    wherein the frame and a motor case surrounding the controller are connected to each other by interference fit,
    wherein a motor section-side case of the motor case is connected to a flange portion formed on an opening-side end portion of the frame by the interference fit, and
    wherein the frame and the motor case are formed of metal such that the interference fit occurs between two metal materials to enhance rigidity.

2. A motor for an electric power steering apparatus, according to claim 1, wherein two sets of the stator windings are wound around the stator core so that an electromagnetic force for deforming the stator core into an ellipsoidal shape is exerted on the stator core.

3. A motor for an electric power steering apparatus, according to claim 2, wherein the number P of poles and the number n of slots satisfy any one of relations: $p-n=2$ and $p-n=-2$.

4. A motor for an electric power steering apparatus, according to claim 3, wherein the number P of poles is ten and the number n of slots is twelve.

5. A motor for an electric power steering apparatus, according to claim 3, wherein the number P of poles is fourteen and the number n of slots is twelve.

6. A motor for an electric power steering apparatus, according to claim 1, wherein the stator windings include winding portions of the same phase respectively arranged in the slots being opposed to each other to be 180 degrees in mechanical angle apart so that an electromagnetic force for deforming the stator core into an ellipsoidal shape is exerted on the stator core.

7. A motor for an electric power steering apparatus, according to claim 1, wherein clearances in the slots are filled with the resin.

8. A motor for an electric power steering apparatus, according to claim 1, wherein the speed reducer mechanism includes a worm provided coaxially with the output shaft.

9. A motor for an electric power steering apparatus, according to claim 1, wherein the frame is made of a steel plate having a thickness of at least 1.6 mm.

10. A motor for an electric power steering apparatus, according to claim 1, wherein the stator core has an outer diameter in a range of 70 mm to 90 mm.

11. A motor for an electric power steering apparatus, according to claim 1, wherein the stator core has an axial length in a range of 20 mm to 70 mm.

12. A motor for an electric power steering apparatus, according to claim 1, wherein a coil is mounted to a terminal portion of the controller for absorbing electromagnetic noise.

13. A motor for an electric power steering apparatus, according to claim 1, wherein capacitors are mounted to a terminal portion of the controller for absorbing a ripple component of a current flowing through the motor section.

14. A motor for an electric power steering apparatus, according to claim 1, wherein the speed reducer mechanism includes a worm and a worm wheel, and the worm wheel is meshed with the worm.

* * * * *